United States Patent
Lee et al.

(10) Patent No.: US 9,025,893 B2
(45) Date of Patent: May 5, 2015

(54) METHOD AND APPARATUS FOR ENCODING IMAGES USING TEMPLATE MATCHING AND METHOD AND APPARATUS FOR DECODING IMAGES

(75) Inventors: Ha Hyun Lee, Seoul (KR); Sung Chang Lim, Daejeon (KR); Hui Yong Kim, Daejeon (KR); Se Yoon Jeong, Daejeon (KR); Jong Ho Kim, Daejeon (KR); Jin Ho Lee, Daejeon (KR); Suk Hee Cho, Daejeon (KR); Jin Soo Choi, Daejeon (KR); Jin Woong Kim, Daejeon (KR); Chie Teuk Ahn, Daejeon (KR); Sung Jea Ko, Seoul (KR); Seung Won Jung, Seoul (KR); Yeo Jin Yoon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 98 days.

(21) Appl. No.: 13/809,344

(22) PCT Filed: Jul. 8, 2011

(86) PCT No.: PCT/KR2011/005001
§ 371 (c)(1),
(2), (4) Date: Jan. 9, 2013

(87) PCT Pub. No.: WO2012/005537
PCT Pub. Date: Jan. 12, 2012

(65) Prior Publication Data
US 2013/0108184 A1 May 2, 2013

(30) Foreign Application Priority Data

Jul. 9, 2010 (KR) .......................... 10-2010-0066326
Dec. 23, 2010 (KR) .......................... 10-2010-0132961

(51) Int. Cl.
*G06K 9/64* (2006.01)
*G06T 9/00* (2006.01)

(52) U.S. Cl.
CPC ...................................... *G06T 9/004* (2013.01)

(58) Field of Classification Search
None
See application file for complete search history.

(56) References Cited

U.S. PATENT DOCUMENTS

| | | | |
|---|---|---|---|
| 2008/0117981 A1* | 5/2008 | Lee et al. | 375/240.24 |
| 2009/0116759 A1* | 5/2009 | Suzuki et al. | 382/238 |
| 2009/0225847 A1* | 9/2009 | Min et al. | 375/240.16 |
| 2010/0166075 A1* | 7/2010 | Lee et al. | 375/240.16 |
| 2011/0176611 A1* | 7/2011 | Huang et al. | 375/240.16 |
| 2011/0228853 A1* | 9/2011 | Suzuki et al. | 375/240.16 |
| 2011/0280302 A1* | 11/2011 | Alshina et al. | 375/240.03 |
| 2012/0281752 A1* | 11/2012 | Zheng et al. | 375/240.03 |
| 2012/0320983 A1* | 12/2012 | Zheng et al. | 375/240.16 |

FOREIGN PATENT DOCUMENTS

KR 1020100019541 A 2/2010

* cited by examiner

*Primary Examiner* — Jingge Wu
(74) *Attorney, Agent, or Firm* — NSIP Law

(57) ABSTRACT

Provided are a method and an apparatus for encoding images using template matching and a method and an apparatus for decoding images. The method for encoding the images can determine a template of an encoding target block and can determine a matching search target image for performing a matching search with the determined template among the recovered reference images. In addition, an optimum prediction block can be determined on the basis of the determined matching search target image and the template of the encoding target block.

20 Claims, 20 Drawing Sheets

TEMPLATE

METHOD AND APPARATUS FOR ENCODING IMAGES USING TEMPLATE MATCHING AND METHOD AND APPARATUS FOR DECODING IMAGES

CROSS-REFERENCE TO RELATED APPLICATIONS

This application is a national stage application under 35 USC 371 of International Application No. PCT/KR2011/005001 filed on Jul. 8, 2011, which claims the benefit of Korean Application No. 10-2010-0132961 filed on Dec. 23, 2010, and Korean Application No. 10-2010-0066326 filed on Jul. 9, 2010, in the Korean Intellectual Property Office, the entire disclosures of which are incorporated herein by reference for all purposes.

TECHNICAL FIELD

The present invention relates to technologies for encoding and decoding an image by using template matching in a restored reference image.

BACKGROUND ART

In general, image encoding and decoding apparatuses using a template determine a prediction block for an encoding target block by matching the template of the encoding target block with all restored reference images.

In particular, the image encoding and decoding apparatuses determine a matching target region by using only distortion between the template of the encoding target block and the matching target region and determine the prediction block of the encoding target block based on the determined matching target region.

However, when only the distortion between the template of the encoding target block and the matching target region is used, an error between the prediction block corresponding to the matching target region having minimum distortion and the encoding target block may be large.

Moreover, as template matching is performed using all the restored reference images, calculation complexities of the image encoding and decoding apparatuses increase.

Therefore, the technologies for image encoding and decoding capable of reducing the error between the prediction block and the encoding target block while reducing the calculation complexities are required.

DISCLOSURE

Technical Problem

The present invention provides a method and an apparatus for image encoding and a method and an apparatus for image decoding capable of reducing calculation complexities by simplifying a process of determining a matching target region by using a template of an encoding target block and a template of a decoding target block.

The present invention also provides a method and an apparatus for image encoding and a method and an apparatus for image decoding capable of determining an optimal prediction block by using similarities between the template and the prediction block and distortion between the template and the matching target region.

The present invention also provides a method and an apparatus for image encoding and a method and an apparatus for image decoding capable of generating residual blocks by using offset or filtering in the optimal prediction block.

Technical Solution

In an aspect, there is provided an image encoding method, including: determining a template of an encoding target block; determining a matching search target image by using at least one of encoding information of an image to which the encoding target block belongs, encoding information of a neighboring block, and user definition information; determining an optimal prediction block by using the matching search target image and the template; and generating residual blocks by using the optimal prediction block and the encoding target block.

In the determining of the matching search target image, one or more reference images corresponding to an image type of the image to which the encoding target block belongs among restored reference images may be determined as the matching search target image.

In the determining of the matching search target image, one or more reference images corresponding to a reference picture type of the neighboring block among the restored reference images may be determined as the matching search target image.

In the determining of the matching search target image, a reference image determined by user definition among the restored reference images may be determined as the matching search target image. In this case, the matching search target image information may be transmitted to an image decoding apparatus by using a sequence parameter set (SPS) or a picture parameter set (PPS).

In the determining of the optimal prediction block, the optimal prediction block may be determined by using at least one of distortion between the template and a matching target region and the similarity between the template and a prediction block.

The determining of the optimal prediction block may include: calculating distortion between the template and the matching target region included in the matching search target image; selecting a plurality of prediction blocks in the order in which the distortion is smaller; judging the respective similarities between the plurality of selected prediction blocks and the template; and determining as the optimal prediction block a prediction block having the highest similarity from the plurality of selected prediction blocks.

The determining of the optimal prediction block may include: calculating the respective similarities between the template and the prediction blocks included in the matching search target image; selecting a plurality of prediction blocks in the order in which the similarity is higher; calculating the respective distortions between the matching target regions corresponding to the plurality of selected prediction blocks and the template; and determining a prediction block in which the distortion is the minimum as the optimal prediction block.

In the determining of the template, the template may be determined by using at least one of a pixel set constituting a restored neighboring block and a prediction pixel set for the encoding target block. Herein, the restored neighboring block may be an already restored block among blocks adjacent to the encoding target block. Herein, in the above case, the shape and size of the template to be determined may be adaptively selectable.

The generating of the residual blocks includes: filtering the optimal prediction block; and generating the residual blocks by subtracting the filtered optimal prediction blocks from the encoding target blocks.

Further, an image encoding apparatus according to an exemplary embodiment of the present invention includes: a matching search target image determining unit determining a matching search target image by using at least one of encoding information of an image to which an encoding target block, encoding information of a neighboring block, and user definition information among restored reference images; an optimal prediction block determining unit determining an optimal prediction block by using the matching search target image and a template of the encoding target block; and a residual block generating unit generating residual blocks by using the optimal prediction block and the encoding target block.

In another aspect, there is provided an image decoding method, including: determining a template of a decoding target block; determining a matching search target image by using at least one of decoding information of an image to which the decoding target block belongs, decoding information of a neighboring block, and matching search target image information; determining an optimal prediction block by using the matching search target image and the template; and generating restored blocks based on the optimal prediction block and restored residual blocks.

In the determining of the matching search target image, one or more reference images may be determined as the matching search target image among restored reference images based on an image type of the image to which the encoding target block belongs, a reference picture type of the neighboring block, and matching search target image information encoded and transmitted in a sequence parameter set (SPS) or a picture parameter set (PPS).

Further, in the determining of the optimal prediction block, the optimal prediction block may be determined by using at least one of distortion between the template and a matching target region and the similarity between the template and a prediction block.

In the determining of the template, the template may be determined by using at least one of a pixel set constituting a restored neighboring block and a prediction pixel set for the decoding target block.

In another aspect, there is provided an image decoding apparatus, including: a matching search target image determining unit determining a matching search target image which performs matching search of the decoding target block by using at least one of decoding information of an image to which a decoding target block, decoding information of a neighboring block, and matching search target image information; an optimal prediction block determining unit determining an optimal prediction block by using the matching search target image and the template; and a restored block generating unit generating restored blocks by using the optimal prediction block and restored residual blocks.

Advantageous Effects

According to exemplary embodiments of the present invention, calculation complexity can be reduced and an error between a prediction block and an encoding target block can be reduced.

BRIEF DESCRIPTION OF THE DRAWINGS

FIG. 12 and FIG. 13 are flowcharts provided to describe a configuration for determining an optimal prediction block based on the similarity between a template of an encoding target block and a prediction block.

MODE FOR INVENTION

Figure 1:
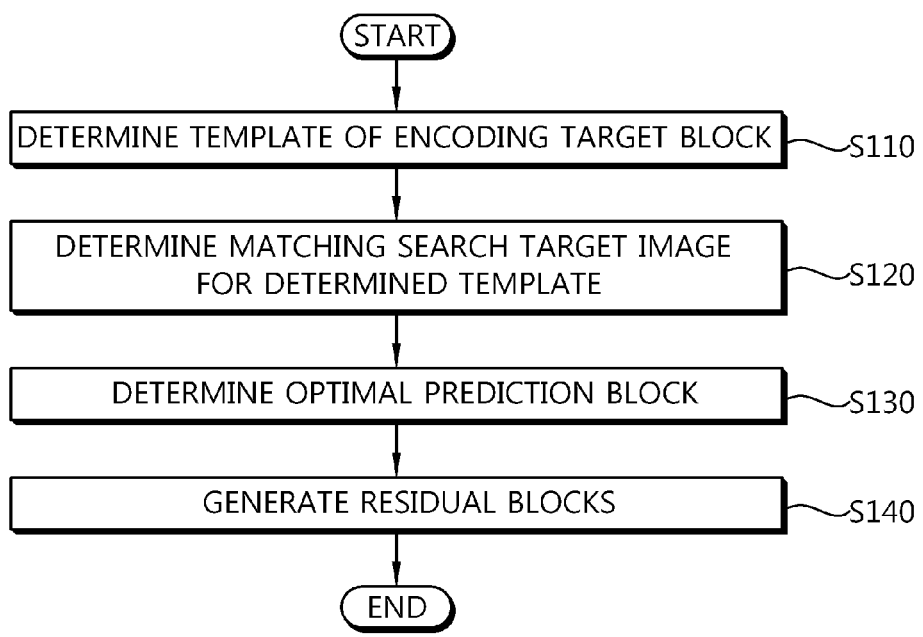
FIG. 1 is a flowchart provided to describe an image encoding method according to an exemplary embodiment of the present invention.

Hereinafter, exemplary embodiments according to the present invention will be described in detail with reference to the accompanying drawings. However, the present invention is not limited thereto. Further, like elements refer to like reference numerals shown in the drawings.

FIG. 1 is a flowchart provided to describe an image encoding method according to an exemplary embodiment of the present invention.

First, in step S110, an image encoding apparatus may determine a template of an encoding target block.

In this case, the image encoding apparatus may determine the template by using at least one of a pixel set constituting a restored neighboring block and a prediction pixel set for the encoding target block. Herein, the restored neighboring block may be an already restored block among blocks adjacent to the encoding target block. Herein, the shape and size of the template to be determined may be adaptively selectable.

Figure 2:
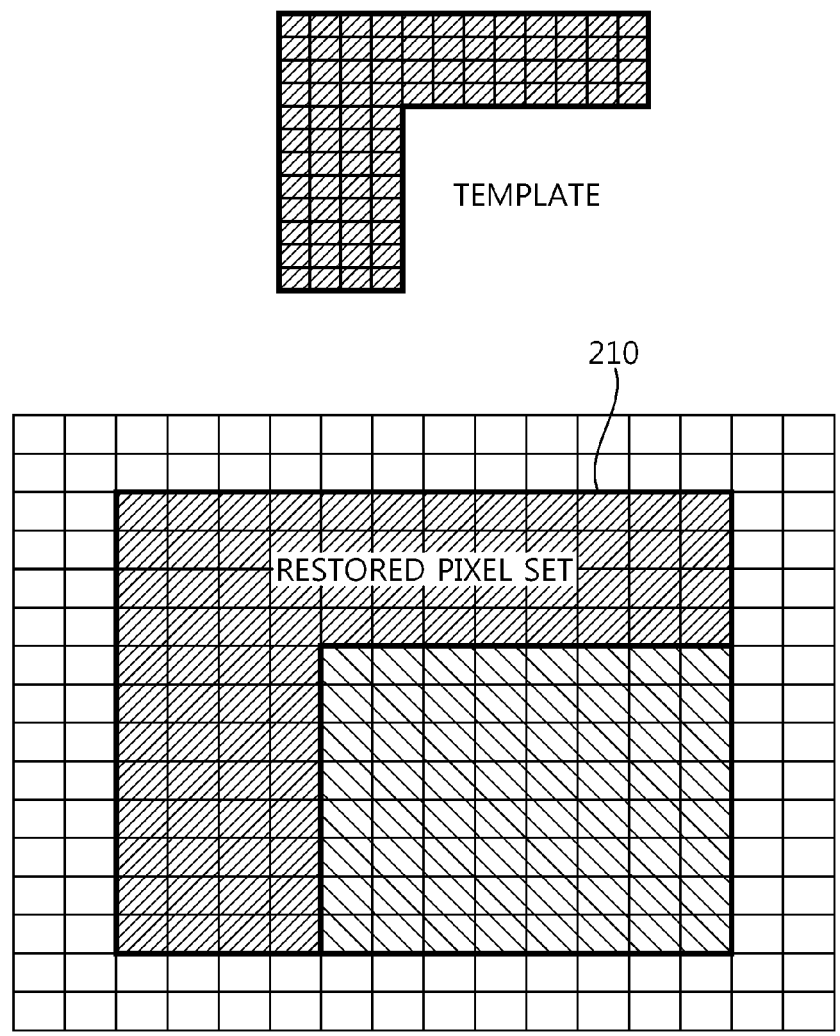
FIG. 2, FIG. 3, and FIG. 4 are diagrams provided to describe a configuration for determining a template of an encoding target block.

As an example, when the template is determined using the pixel set constituting the restored neighboring block, the image encoding apparatus may determine a template 210 of the encoding target block by using pixels constituting each of the restored neighboring blocks as shown in FIG. 2.

Figure 3:
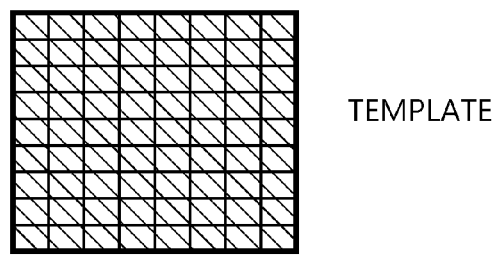
Figure 3:
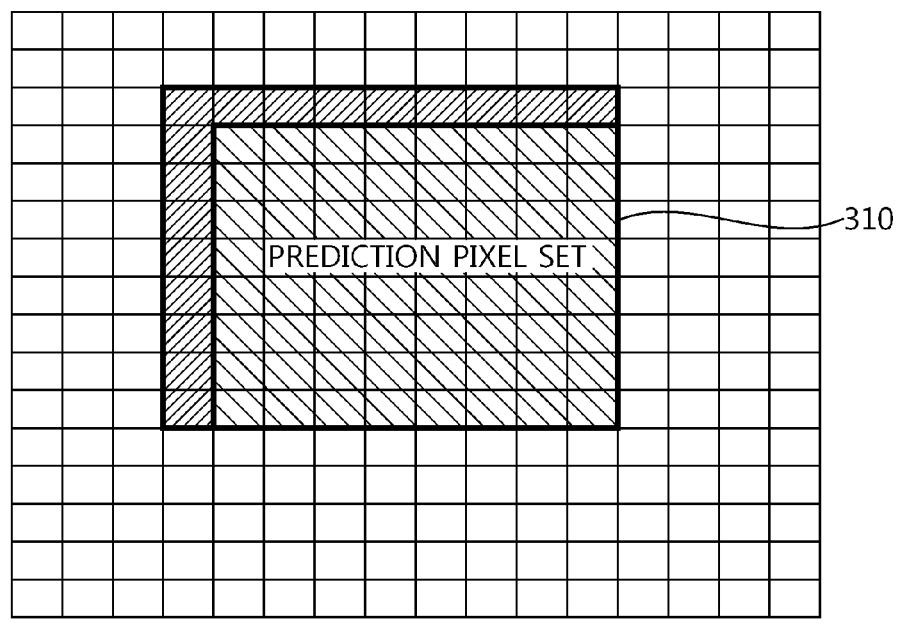

As another example, when the template is determine using the prediction pixel set for the encoding target block, the image encoding apparatus may determine a template 310 of the encoding target block by using the prediction pixel set generated by predicting the encoding target block in a screen as shown in FIG. 3.

Figure 4:
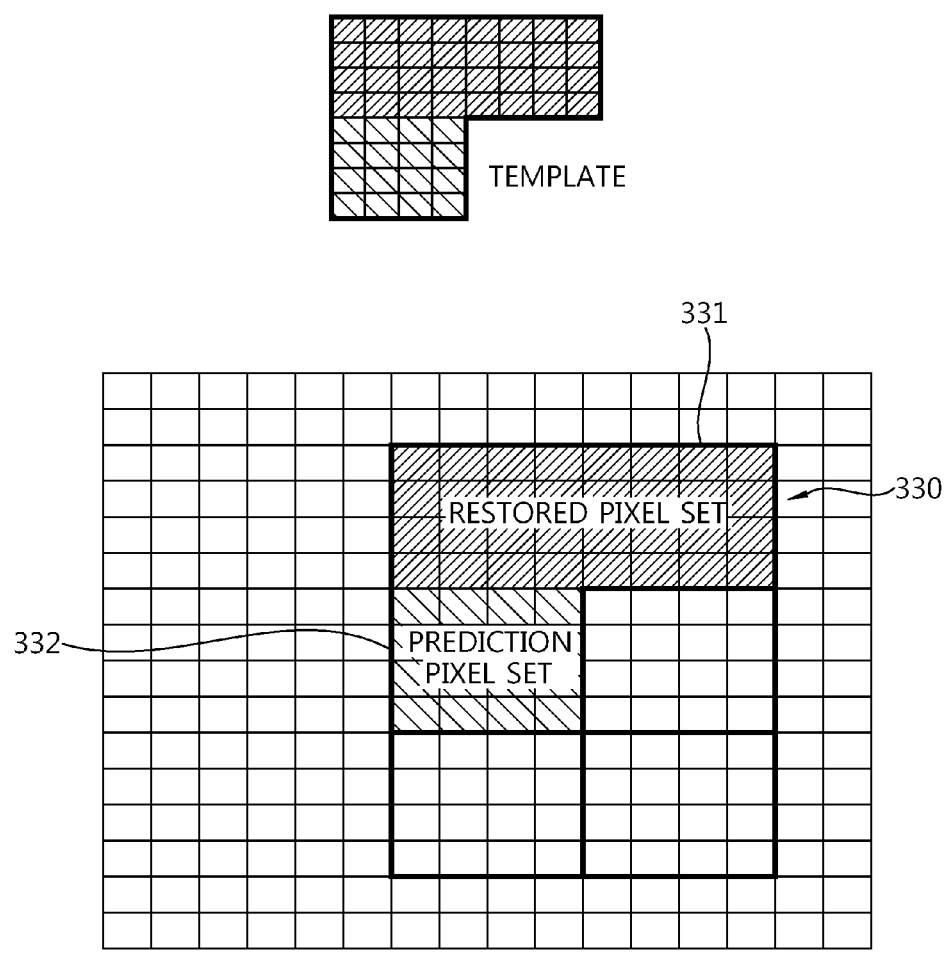

As yet another example, in the case where the template is determined using both the pixel set constituting the restored neighboring block and the prediction pixel set for the encoding target block, when a present encoding target block is divided into four subblocks and each subblock is predicted and thereafter, the encoding target block is converted and encoded as shown in FIG. 4, the image encoding apparatus may determine a template 430 of the encoding target block by using a prediction pixel set 432 constituting a subblock of which the prediction is completed and a pixel set 431 constituting the restored neighboring block when there is no usable neighboring restored block. In this case, in FIG. 4, the encoding target block may be divided into a plurality of subblocks and the prediction pixel set for one or more subblock among the divided subblocks may be generated.

Next, in step S120, the image encoding apparatus may determine the matching search target image for the template determined among the restored reference images.

In this case, the image encoding apparatus may determine the matching search target image by using at least one of encoding information of an image to which the encoding target block belongs, encoding information of the neighboring block, and user definition information. Therefore, the image encoding apparatus may perform matching search with the template of the encoding target block targeting the determined matching search target image. In this case, a detailed description to determine the matching search target image will be made below with reference to FIGS. 5 to 7.

In addition, in step S130, the image encoding apparatus may determine the optimal prediction block in the matching search target image by using the template of the encoding target block.

In this case, the image encoding apparatus may determine the optimal prediction block based on the distortion between the template of the encoding target block and the matching target region and the similarity between the template of the encoding target block and the prediction block. A detailed description to determine the optimal prediction block will be made below with reference to FIGS. 8 to 14.

Next, in step S140, the image encoding apparatus may generate the residual blocks based on the optimal prediction block and the encoding target block.

In this case, the image encoding apparatus may generate the residual blocks by using at least one of the difference between the optimal prediction block and the encoding target block, the offset, and filtering of the optimal prediction block. Herein, a detailed description to generate the residual blocks will be made below with reference to FIGS. 15 to 17.

Hereinafter, referring to FIGS. 5 to 7, a process of determining the matching search target image performing matching search with the template of the encoding target block among the restored reference images will be described.

Figure 5:
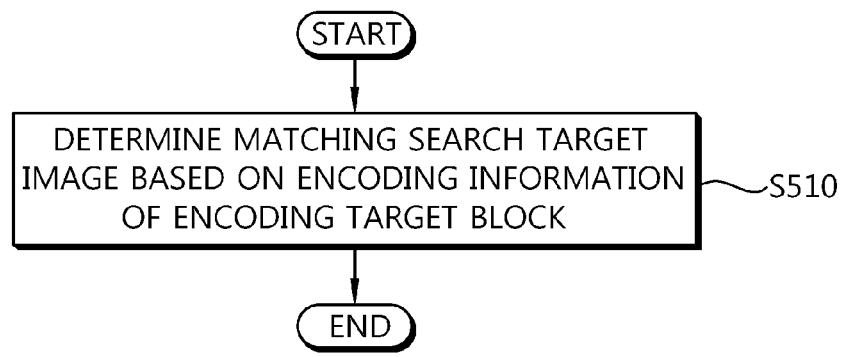
FIG. 5, FIG. 6, and FIG. 7 are flowcharts provided to describe a configuration for determining a matching search target image.

FIG. 5 is a flowchart provided to describe a configuration for determining a matching search target image based on encoding information of an encoding target block.

Referring to FIG. 5, in step S510, the image encoding apparatus may determine one or more matching search target images among the restored reference images based on the encoding information of the encoding target block.

In this case, when an image type is used among the encoding information of the encoding target block, the image encoding apparatus may determine as the matching search target image one or more reference images having the same image type as the image to which the encoding target block belongs among the restored reference images.

As an example, when the image type of the image to which the encoding target block belongs is a P type, the image encoding apparatus may extract images of which image types are the P type among the restored reference images. In addition, the image encoding apparatus may determine one or more extracted reference images as the matching search target image.

As another example, when the image type of the image to which the encoding target block belongs is a B type, the image encoding apparatus may extract images of which image types are the B type among the restored reference images and determine the extracted mages as the matching search target image.

Figure 6:
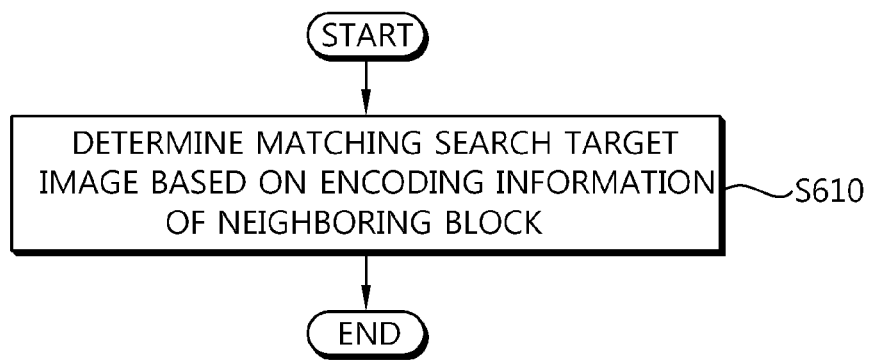

FIG. 6 is a flowchart provided to describe a configuration for determining a matching search target image based on encoding information of the neighboring block.

Referring to FIG. 6, in step S610, the image encoding apparatus may determine one or more matching search target images among the restored reference images based on the encoding information of the neighboring block adjacent to the encoding target block.

In this case, when a reference picture type of the neighboring block is used, the image encoding apparatus may determine as the matching search target image one or more reference images having the same reference picture type as the neighboring block among the restored reference images.

As an example, when the reference picture type of the neighboring block is a type to refer to a short-time reference image, the image encoding apparatus may extract one or more short-time reference images from the restored reference images. In addition, the image encoding apparatus may determine one or more extracted short-time reference images as the matching search target image.

As another example, when the reference picture type of the neighboring block is a type to refer to a long-time reference image, the image encoding apparatus may extract one or more long-time reference images from the restored reference images. In addition, the image encoding apparatus may determine one or more extracted long-time reference images as the matching search target image.

As another example, the number of restored reference images which can be used as the matching search target image may be limited by user definition. In this case, only the restored reference image defined by a user may be determined as the matching search target image. Therefore, the image encoding apparatus may transmit matching search target image information used to identify the determined matching search target image to an image decoding apparatus through a sequence parameter set (SPS), a picture parameter set (PPS), and the like.

As yet another example, when all of a plurality of neighboring blocks adjacent to the encoding target block refer to the same reference image, the image encoding apparatus may extract a reference image which the neighboring blocks refer to from the restored reference images and determine the extracted reference image as the matching search target image.

Figure 7:
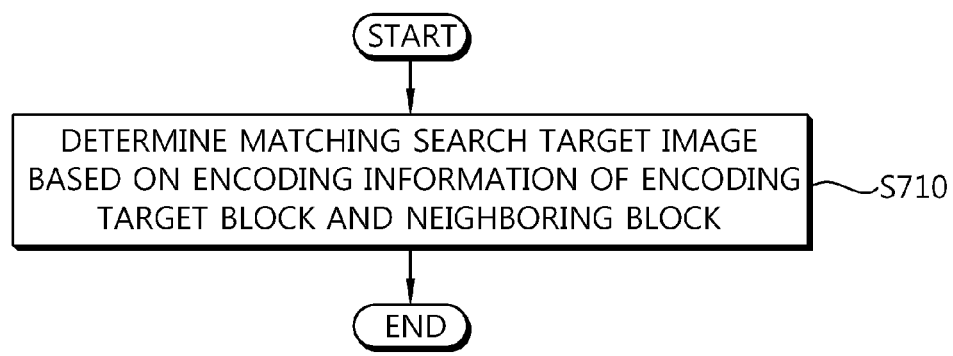

Further, as shown in FIG. 7, in step S710, the image encoding apparatus may determine the matching search target image by using both the encoding information of the encoding target block and the encoding information of the neighboring block.

Hereinafter, referring to FIGS. 8 to 14, a process of determining the optimal prediction block by performing matching search with the template of the encoding target block targeting the determined matching search target image will be described.

Figure 8:
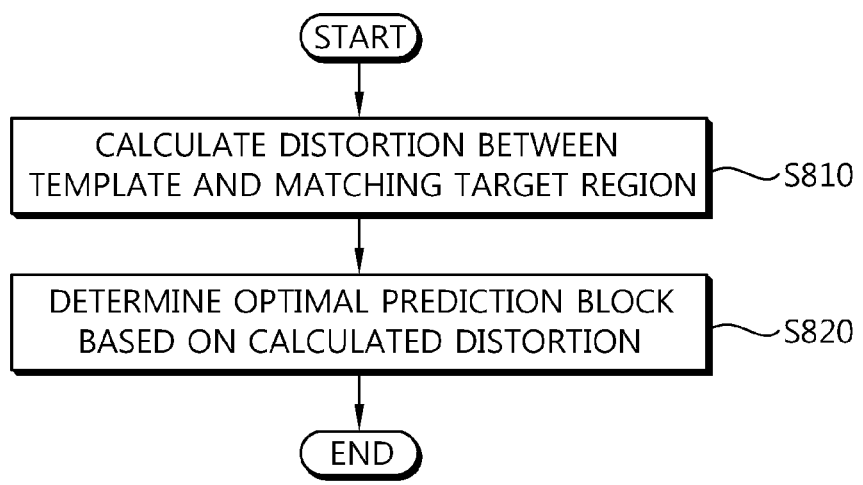
FIG. 8, FIG. 9, FIG. 10, FIG. 11, FIG. 12, FIG. 13, and FIG. 14 are diagrams provided to describe a configuration for determining an optimal prediction block.

FIG. 8 is a flowchart provided to describe a configuration for determining an optimal prediction block based on distortion between a template of an encoding target block and a matching target region.

Referring to FIG. 8, in step S810, the image encoding apparatus may calculate the distortion between the template of the encoding target block and the matching target region. Herein, the matching target region has the same geometrical shape as the template of the encoding target block within the matching search target image.

In this case, the image encoding apparatus may calculate the distortion by using a sum of absolute difference (SAD), a sum of absolute transformed difference (SATD), a sum of squared difference (SSD), and the like.

Next, in step S820, the image encoding apparatus may determine the optimal prediction block based on the calculated distortion.

Figure 9:
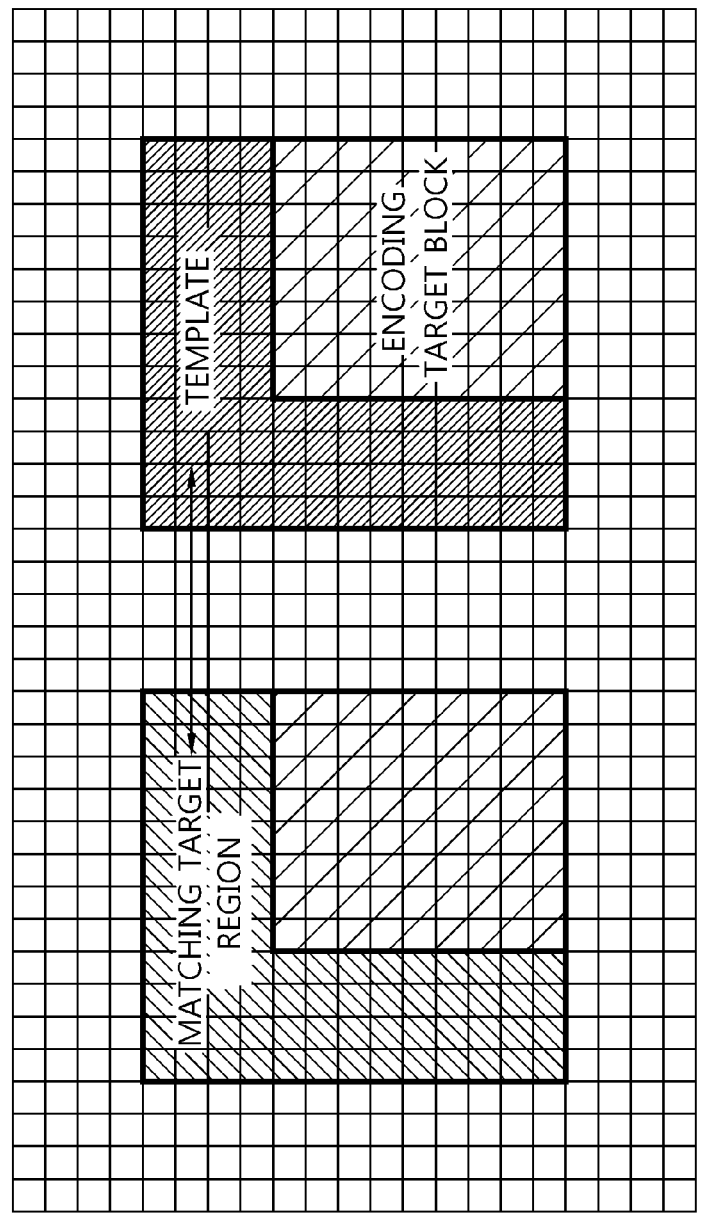

As an example, referring to FIG. 9, the sum of absolute difference which is the sum of differences between corresponding pixels between the template of the encoding target block and the matching target region may be calculated and a prediction block having a geometrical positional relationship with a matching target region corresponding to a position where the calculated sum of the pixel differences is the minimum which is the same as a geometrical positional relationship between the template and the encoding target block may be determined as the optimal prediction block. In this case, the image encoding apparatus may calculate the sum of the differences of the corresponding pixels between the template of the encoding target block and the matching target image, that is, the distortion by using Equation 1 below.

$$D = D_{TPL} = \sum_{i=0}^{N} (T_i - C_i)$$ [Equation 1]

In Equation 1, $T_i$ represents a pixel set of the template and $C_i$ represents a pixel set of the matching target region.

Figure 10:
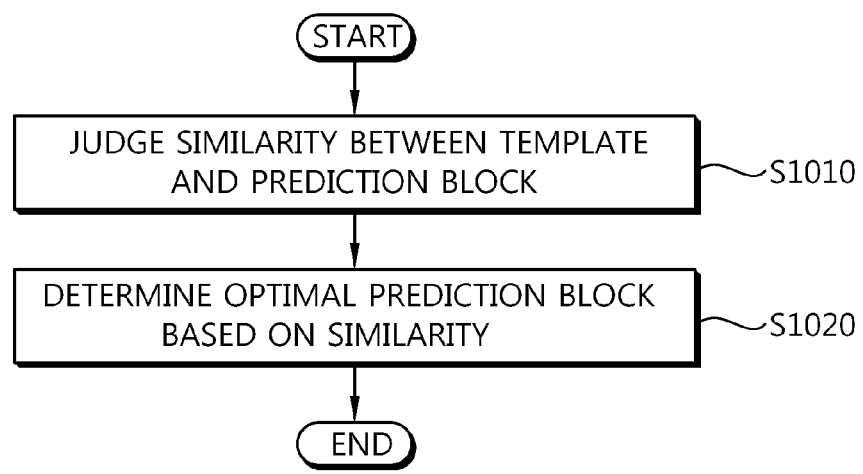

FIG. 10 is a flowchart provided to describe a configuration for determining an optimal prediction block based on the similarity between a template of an encoding target block and a prediction block.

Referring to FIG. 10, in step S1010, the image encoding apparatus may judge the similarity between the template of the encoding target block and the prediction block. Herein, the prediction block has the same geometrical shape as the encoding target block within the matching search target image.

Figure 11:
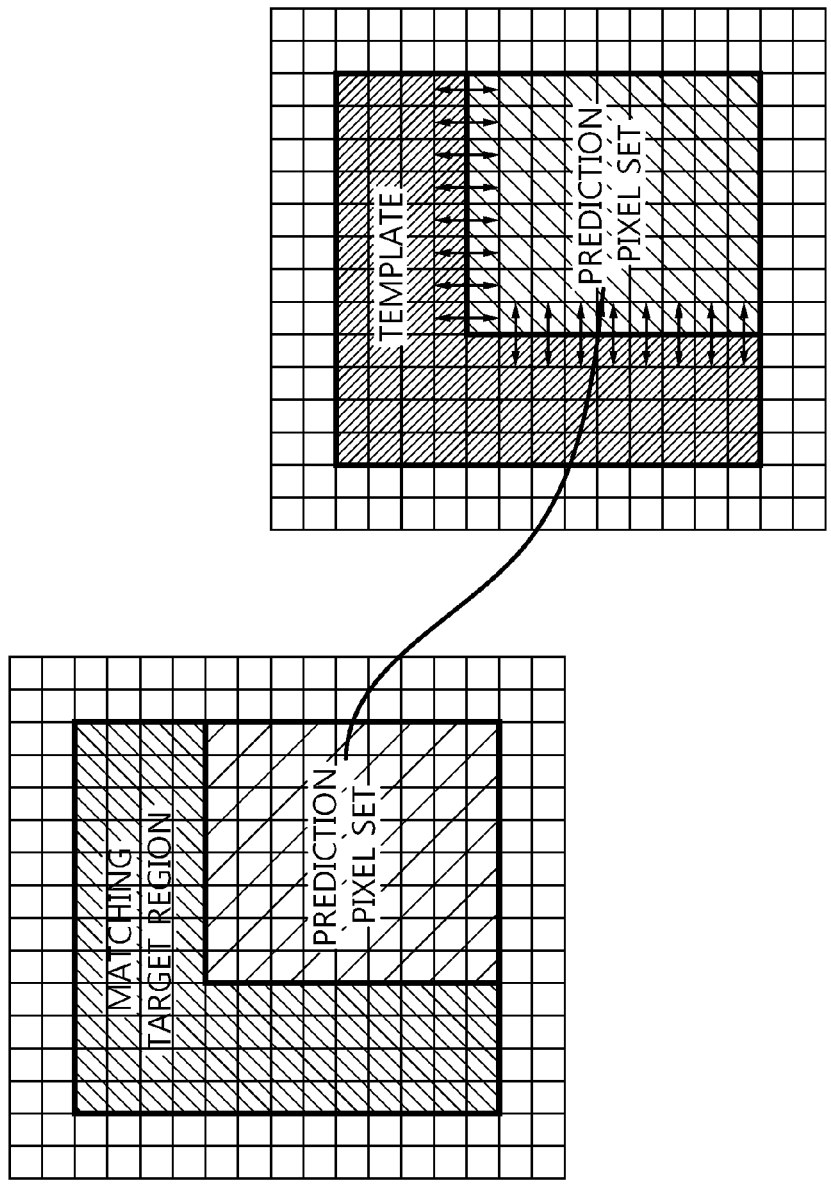

As an example, as shown in FIG. 11, the image encoding apparatus may judge the similarity between the template and the prediction block by using the SAD, the SATD, and the SSD between pixels positioned at the template of the encoding target block and a prediction block border. In this case, as shown in Equation 2 below, the image encoding apparatus may judge the similarity by using difference values between the pixels positioned at the template of the encoding target block and the prediction block border.

$$D = D_{SM} = \sum_{i=0}^{N} (Tb_i - Pb_i)$$ [Equation 2]

In Equation 2, $Tb_i$ represents a pixel set of the template block border and $Pb_i$ represents a block border pixel set of the prediction pixel set.

In this case, the image encoding apparatus may judge the similarity between the template of the encoding target block and the prediction block to be higher as the calculated difference value is smaller according to Equation 2. In addition, the image encoding apparatus may judge the similarity between the template of the encoding target block and the prediction block to be lower as the difference value is larger.

As another example, the image encoding apparatus may judge the similarity between the template and the prediction block by using the variance of the difference value X between the pixels positioned at the template of the encoding target block and the prediction block border. In this case, the variance of the calculated difference values is shown in Equation 3 below.

$$D = \text{var}(X)$$ [Equation 3]

As yet another example, the image encoding apparatus may judge the similarity between the template and the prediction block by using correlation values between the pixels constituting the template and the pixels positioned on the prediction block border. In this case, the image encoding apparatus may calculate the correlation values by using Equation 4 below. Therefore, the image encoding apparatus may judge the similarity between the template of the encoding target block and the prediction block to be higher as the calculated correlation value is larger. In addition, the image encoding apparatus may judge the similarity between the template of the encoding target block and the prediction block to be lower as the calculated correlation value is smaller.

$$D = \frac{\sum_{i=1}^{N} (Tb_i - E[Tb])(Pb_i - E[Pb])}{(N-1)S_{Tb}S_{Pb}}$$ [Equation 4]

In Equation 4, $Tb_i$ represents the template block border pixel set, $Pb_i$ represents the block border pixel set of the prediction pixel set, $E[Tb]$ represents an average of the template block border pixel set, $E[Pb]$ represents an average of the block border pixel set of the prediction pixel set, $S_{Tb}$ represents a standard deviation of the template block border pixel set, and $S_{Pb}$ represents a standard deviation of the block border pixel set of the prediction pixel set.

Next, in step S1020, the image encoding apparatus may determine the optimal prediction block based on the similarity between the template of the encoding target block and the prediction block. As an example, the image encoding apparatus may determine as the optimal prediction block a prediction block having the highest similarity among the prediction blocks included in the matching search target image.

Figure 12:
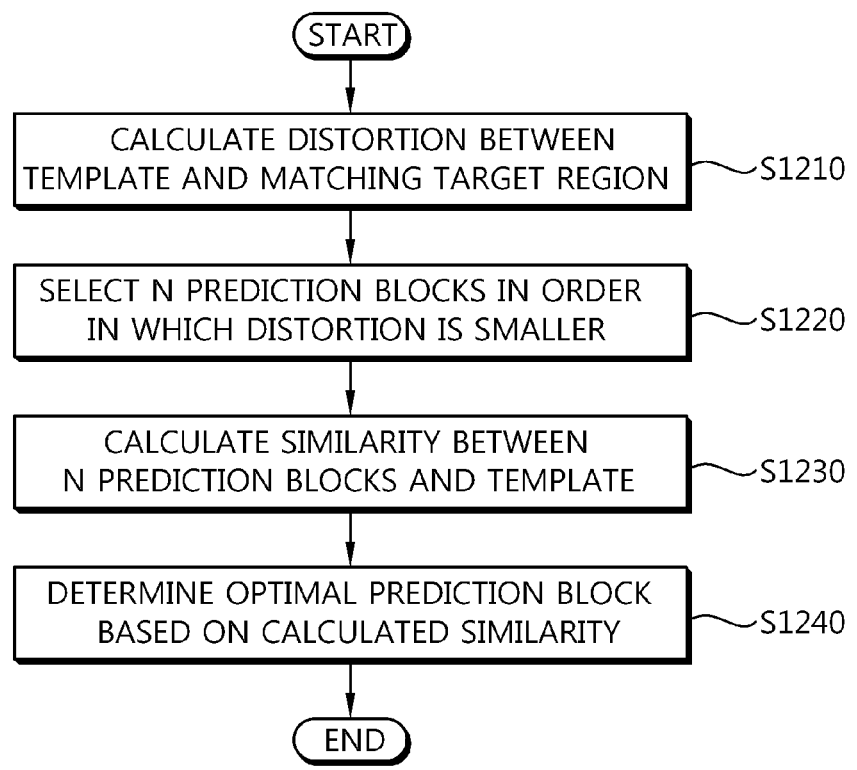
Figure 13:
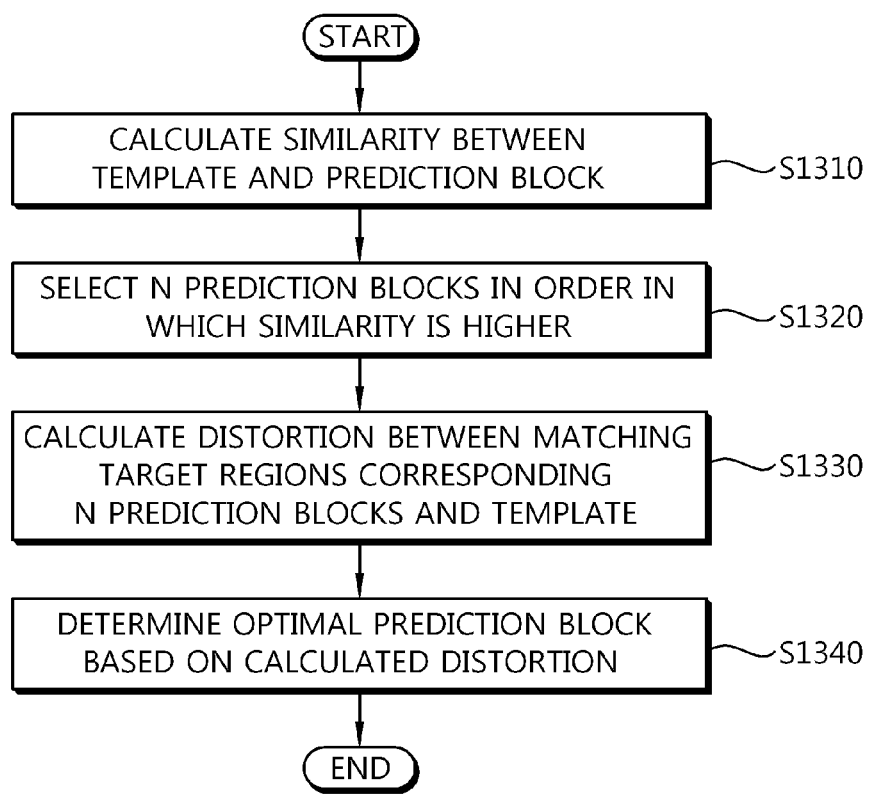

FIGS. 12 and 13 are flowcharts provided to describe a configuration for determining an optimal prediction block by considering both distortion between a template of an encoding target block and a matching target region and the similarity between the template of the encoding target block and a prediction block.

First, in step S810, referring to FIG. 1210, the image encoding apparatus may calculate the distortion $D_{TPL}$ between the template of the encoding target block and the matching target region. As an example, when the matching search target image is multiple, the image encoding apparatus may calculate the respective distortions between the template of the encoding target block and the matching target regions included in the multiple matching search target images.

In addition, in step S1220, the image encoding apparatus may select N prediction blocks in the order in which the calculated distortion is smaller. In other words, the image encoding apparatus may select N prediction blocks in the order in which the distortion is smaller from the prediction blocks included in each of the multiple matching search target images.

Next, in step S1230, the image encoding apparatus may calculate the similarity between N selected prediction blocks and the template of the encoding target block.

In addition, in step S1240, the image encoding apparatus may determine the optimal prediction block among the N selected prediction blocks based on the calculated similarity.

As an example, the image encoding apparatus may determine as the optimal prediction block a prediction block having the highest similarity as the template of the encoding target block among the N prediction blocks.

Figure 14:
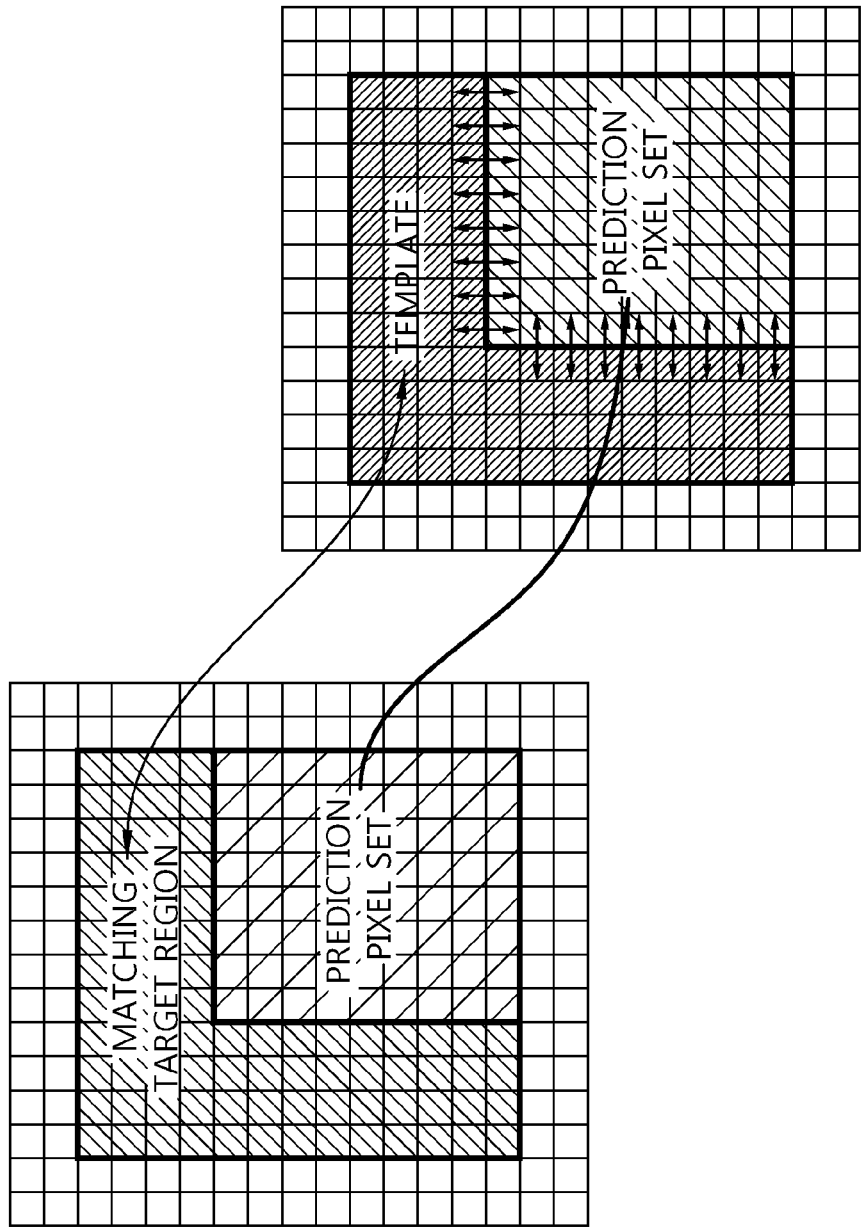

First, in step S1310, referring to FIG. 14, the image encoding apparatus may judge the similarity $D_{SM}$ between the template of the encoding target block and the prediction block and select N prediction blocks in the order in which the similarity is higher from the prediction blocks included in each of the multiple matching search target images.

In this case, the image encoding apparatus may judge the similarity by using the difference values between the pixels positioned at the template of the encoding target block and the prediction block border, the variance of the difference values X between the pixels positioned at the template of the encoding target block and the prediction block border, and the correlation values between the pixels constituting the template and the pixels positioned at the prediction block border or the correlation values between the pixels constituting the template and the pixels positioned at the prediction block border.

Next, in step S1320, the image encoding apparatus may calculate distortion between the matching target regions corresponding to N prediction blocks and the template. In this case, each of the N selected prediction blocks is included in the determined matching search target image. As a result, the image encoding apparatus may calculate the respective distortions between N matching search target regions included in the determined matching search target image and the template.

In addition, in step S1330, the image encoding apparatus may determine the optimal prediction block among the N selected prediction blocks based on the calculated distortions. As an example, the image encoding apparatus may determine a prediction block corresponding to a matching target region in which the calculated distortion is the minimum as the optimal prediction block.

Besides, the image encoding apparatus according to the exemplary embodiment of the present invention may determine the optimal prediction block by using the distortion between the template of the encoding target block and the matching target region and a weighted average value of the similarity between the template of the encoding target block and the prediction block. As an example, the image encoding apparatus may determine the optimal prediction block by using Equation 5 below.

$$D = \alpha D_{TPL} + (1-\alpha)D_{SM} = \alpha \sum_{i=0}^{N}(T_i - C_i) + (1-\alpha)\sum_{j=0}^{M}(Tb_j - Pb_j)$$ [Equation 5]

In Equation 5, $T_i$ represents the pixel set of the template, $C_i$ represents the pixel set of the matching target region, $Tb_j$ represents the pixel set of the template block border, $Pb_j$ represents the block border pixel set of the prediction pixel set, $\alpha$ represents a weighted value, $D_{TPL}$ represents the distortion between the template of the encoding target block and the matching target region, and $D_{SM}$ represents the similarity between the template of the encoding target block and the prediction block.

Up to now, referring to FIGS. 8 to 14, the process of determining the optimal prediction block has been described.

Hereinafter, referring to FIGS. 15 to 17, a configuration for generating the residual blocks will be described in detail.

Figure 15:
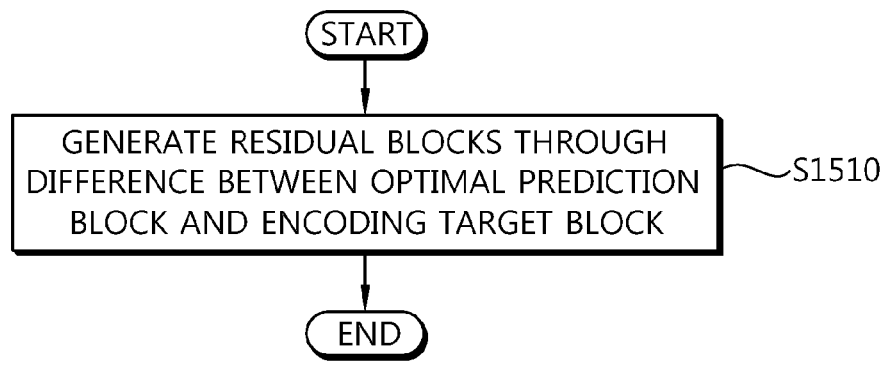
FIG. 15, FIG. 16, and FIG. 17 are flowcharts provided to describe a configuration for generating residual blocks.

Referring to FIG. 15, in step S1510, the image encoding apparatus may generate the residual blocks through the difference between the optimal prediction blocks and the encoding target blocks. In other words, the image encoding apparatus may generate the residual blocks by using the difference in pixel value between the pixels at positions corresponding to each other among the pixels constituting the encoding target blocks and the pixels constituting the optimal prediction block as shown in Equation below.

$$R\_Block(x,y)=O\_Block(x,y)-P\_Block(x,y)$$ [Equation 6]

In Equation 6, R_Block represents the pixel value of the residual block, O_Block represents the pixel value of the encoding target block, and P_Block represents the pixel value of the optimal prediction block.

Figure 16:
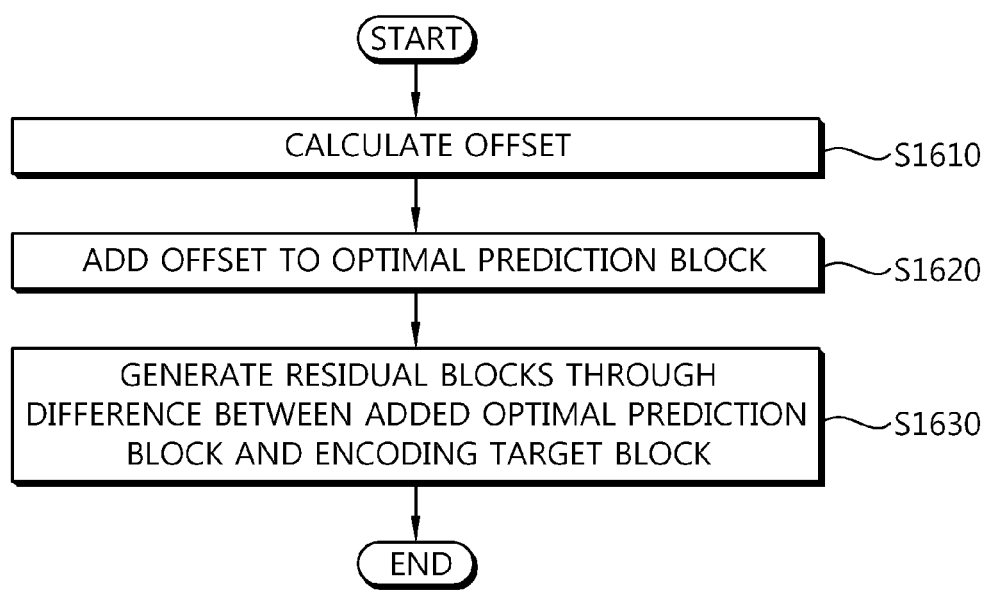

FIG. 16 is a flowchart provided to describe a process of generating residual blocks by using offset.

First, in step S1610, the image encoding apparatus may calculate offset to be added to the optimal prediction block.

As an example, the image encoding apparatus may calculate a difference value between an average value of the pixels constituting the template of the encoding target block and an average value of the pixels constituting the matching target region. In addition, the image encoding apparatus may use the calculated difference value as the offset. In this case, since the image decoding apparatus can calculate the offset by the same method as the image encoding apparatus, the image encoding apparatus does not need to additionally transmit the offset to the image decoding apparatus.

As another example, the image encoding apparatus calculates the difference between an average value of the pixels constituting the encoding target block and the average value of the pixels constituting the optimal prediction block difference value to use the calculated difference as the offset. In this case, the image encoding apparatus may encode offset information including the calculated offset and transmit the encoded offset information to the image decoding apparatus.

As yet another example, the image encoding apparatus may calculate the offset by using a rate-distortion method among values in a predetermined range. Therefore, the image encoding apparatus may encode offset information including the calculated offset and transmit the encoded offset information to the image decoding apparatus.

Next, in step S1620, the image encoding apparatus may add the calculated offset to the optimal prediction block.

In addition, in step S1630, the image encoding apparatus may generate the residual blocks by subtracting the optimal prediction blocks added with the offset from the encoding target blocks. As an example, the image encoding apparatus may generate the residual blocks by using Equation 7 below.

$$R\_Block(x,y)=O\_Block(x,y)-(P\_Block(x,y)+\text{offset})$$ [Equation 7]

In Equation 7, R_Block represents the residual block, O_Block represents the encoding target block, P_Block represents the optimal prediction block, and offset represents the offset.

Figure 17:
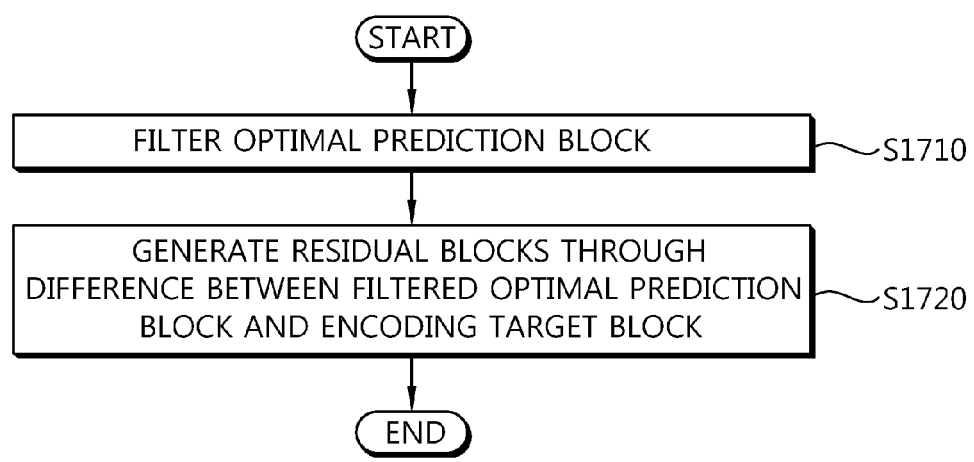

FIG. 17 is a flowchart provided to describe a process of generating residual blocks by filtering an optimal prediction block.

First, in step S1710, the image encoding apparatus may filter the optimal prediction block.

As an example, the image encoding apparatus may filter the optimal prediction block by using a low pass filter. Herein, the low pass filter may have a fixed type filter coefficient.

As another example, the image encoding apparatus may filter the optimal prediction block by using an adaptive filter. Herein, the adaptive filter may have an adaptive filter coefficient.

In this case, the image encoding apparatus may determine the adaptive filter coefficient based on the relationship between the template of the encoding target block and the matching target region as shown in Equation 8 below. Similarly, the image decoding apparatus may also determine the adaptive filter coefficient based on the relationship between a template of a decoding target block and the matching target region.

$$c_i = \mathrm{argmin}E[\mathrm{error}_k^2],$$
$$\mathrm{error}_k = \sum_{i \in \{S\}} c_i \cdot y_i - t_k$$
[Equation 8]

In Equation 8, $t_k$ represents a pixel value of the template, $y_i$ represents a pixel value of the matching target region, and $c_i$ represents a filter coefficient.

Further, the image encoding apparatus may determine the adaptive filter coefficient based on the relationship between the template of the encoding target block and the prediction block as shown in Equation 9 below. In this case, the image encoding apparatus may encode the determined filter coefficient and transmit the encoded filter coefficient to the image decoding apparatus.

$$c_i = \mathrm{argmin}E[\mathrm{error}_k^2],$$
$$\mathrm{error}_k = \sum_{i \in \{S\}} c_i \cdot p_i - o_k$$
[Equation 9]

In Equation 9, $o_k$ represents a pixel value of the encoding target block, $p_i$ represents a pixel value of the optimal prediction block, and $c_i$ represents the filter coefficient.

Next, in step S1720, the image encoding apparatus may generate the residual blocks by subtracting the filtered optimal prediction blocks from the encoding target blocks. As an example, the image encoding apparatus may generate the residual blocks by using Equation 10 below.

$$R\_Block(x,y) = O\_Block(x,y) - \mathrm{filtered}\_P\_Block(x,y)$$ [Equation 10]

In Equation 10, R_Block represents the residual block, O_Block represents the encoding target block, and filtered_P_Block represents the filtered optimal prediction block.

In addition, the image encoding apparatus may encode the residual blocks generated according to FIGS. 12 to 16 and thereafter, transmit bitstreams to the image decoding apparatus.

Figure 18:
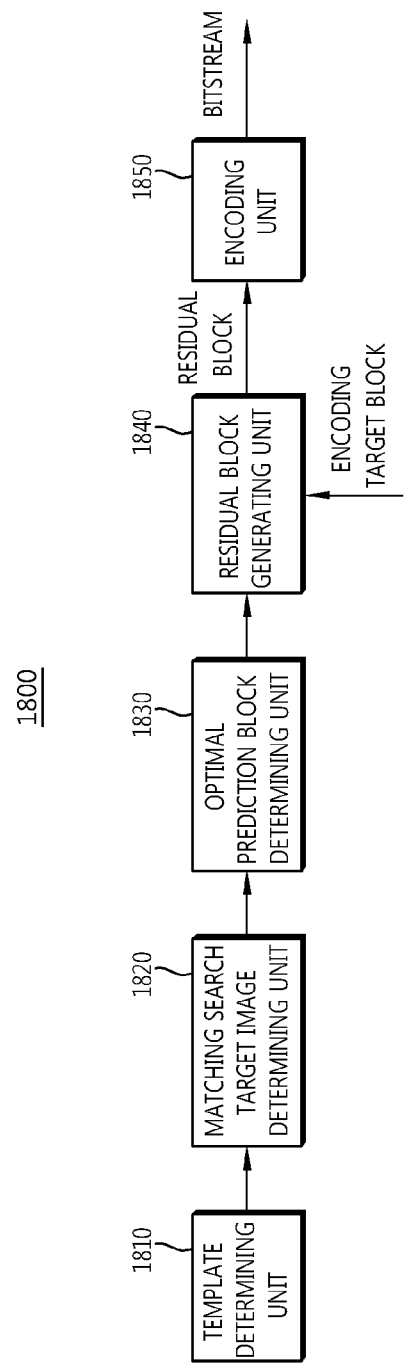
FIG. 18 is a block diagram showing a configuration of an image encoding apparatus according to an exemplary embodiment of the present invention.

FIG. 18 is a block diagram showing a configuration of an image encoding apparatus according to an exemplary embodiment of the present invention.

Referring to FIG. 18, the image encoding apparatus 1800 may include a template determining unit 1810, a matching search target image determining unit 1820, an optimal prediction block determining unit 1830, a residual block generating unit 1840, and an encoding unit 1850.

The template determining unit 1810 may determine the template of the encoding target block by using at least one of the pixel set constituting the restored neighboring block and the prediction pixel set for the encoding target block. Herein, the restored neighboring block may be an already restored block among blocks adjacent to the encoding target block.

In this case, the matching search target image determining unit 1820 may determine the matching search target image by using at least one of encoding information of an image to which the encoding target block belongs, encoding information of the neighboring block, and user definition information. In this case, the user definition information may be transmitted from the image decoding apparatus by using the SPS, the PPS, and the like. As an example, the matching search target image determining unit 1820 may determine as the matching search target image one or more reference images having the same image type as the image to which the encoding target block belongs among the restored reference images.

As another example, the matching search target image determining unit 1820 may determine as the matching search target image one or more reference images having the same reference type as the neighboring block among the restored reference images.

As another example, the matching search target image determining unit 1820 may determine as the matching search target image the reference image determined by the user definition information.

The optimal prediction block determining unit 1830 may determine the optimal prediction block by using the determined matching search target image and the template of the encoding target block. As an example, the optimal prediction block determining unit 1830 may calculate the respective distortions between the template of the encoding target block and one or more matching target regions and determine a prediction block corresponding to a matching target region in which the calculated distortion is the minimum as the optimal prediction block. That is, the optimal prediction block determining unit 1830 may select the matching search target image including the matching target region in which the distortion is the minimum and determine the prediction block included in the selected matching search target image as the optimal prediction block.

As another example, the optimal prediction block determining unit 1830 may determine the optimal prediction block by using the similarity between the template of the encoding target block and the prediction block.

As yet another example, the optimal prediction block determining unit 1830 may determine the optimal prediction block by using all of the similarities between the template of the encoding target block and the prediction block.

The residual block generating unit 1840 may generate the residual blocks by using the determined optimal prediction block and the encoding target block.

As an example, the residual block generating unit 1840 may generate the residual blocks by subtracting the optimal prediction blocks from the encoding target blocks.

As another example, the residual block generating unit 1840 may generate the residual blocks by using the offset. In this case, the residual block generating unit 1840 may generate the residual blocks by adding the offset to the optimal prediction block and subtracting the optimal prediction block added with the offset from the encoding target block.

As yet another example, the residual block generating unit 1840 may generate the residual blocks by filtering the optimal prediction block and subtracting the filtered optimal prediction block from the encoding target block. In this case, the residual block generating unit 1840 may filter the optimal prediction block by using the low pass filter or the adaptive filter.

The encoding unit 1850 may encode the generated residual blocks and thereafter, transmit the bitstreams to the image decoding apparatus.

Figure 19:
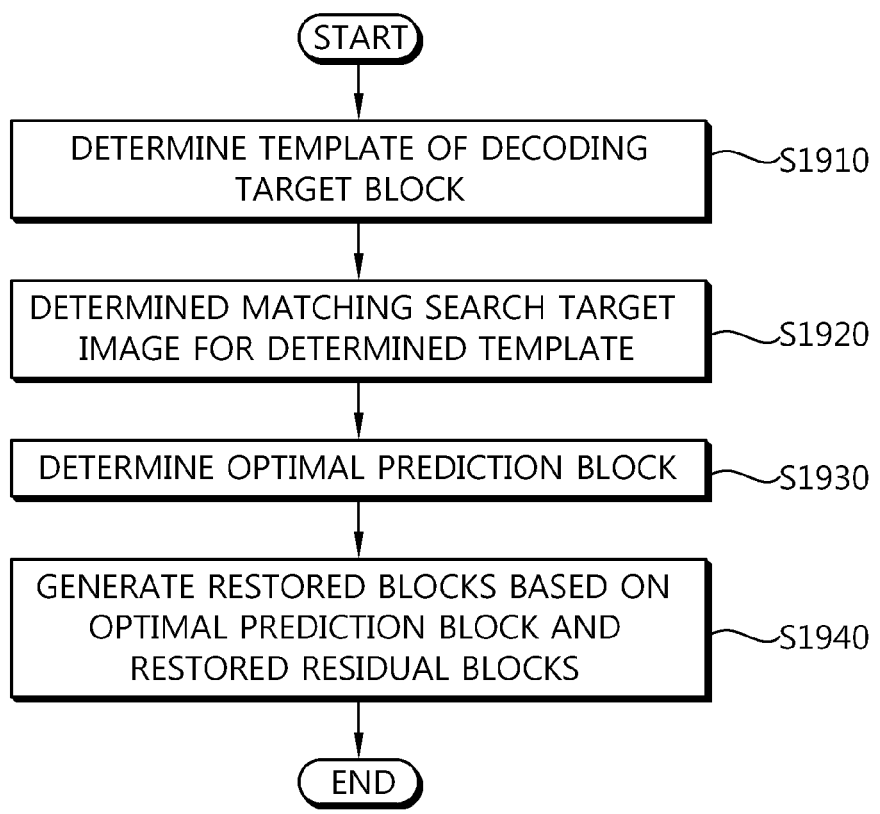
FIG. 19 is a flowchart provided to describe an image decoding method according to an exemplary embodiment of the present invention.

FIG. 19 is a flowchart provided to describe an image decoding method according to an exemplary embodiment of the present invention.

First, in step S1910, the image decoding apparatus may determine the template of decoding target block.

In this case, the image decoding apparatus may determine the template by using at least one of the pixel set constituting the restored neighboring block and the prediction pixel set for the decoding target block. Herein, the restored neighboring block may be an already restored block among blocks adjacent to the decoding target block.

Next, in step S1920, the image decoding apparatus may determine the matching search target image for the determined template.

In this case, the image decoding apparatus may determine the matching search target image which performs matching search with the determined template by using at least one of decoding information of an image to which the decoding target block belongs, decoding information of the neighboring block, and matching search target image information defined in the SPS and the PPS. Herein, since a process of determining the matching search target image among the restored reference images by using the decoding information of the image to which the decoding target block belongs and the decoding information of the neighboring block is the same as the process in the image encoding apparatus, a duplicated description will be omitted.

As an example, when the matching search target image information is used, the image decoding apparatus may select one or more reference images corresponding to identification information from the restored reference images based on identification information included in the matching search target image information. In addition, the image decoding apparatus may determine the selected reference images as the matching search target image.

In addition, in step S1930, the image decoding apparatus may determine the optimal prediction block by performing matching search of the template of the decoding target block targeting the matching search target image.

In this case, the image decoding apparatus may determine the optimal prediction block by using at least one of the distortion between the template of the decoding target block and the matching target region and the similarity between the template of the decoding target block and the prediction block. In this case, since the process of determining the optimal prediction block by using at least one of the distortion between the template of the decoding target block and the matching target region and the similarity between the template of the decoding target block and the prediction block is the same as the process in the image encoding apparatus, a duplicated description will be omitted.

Next, in step S1940, the image decoding apparatus may generate a restored block based on the optimal prediction block and restored residual blocks.

As an example, the image decoding apparatus may extract encoded residual blocks by demultiplexing the bitstreams received from the image encoding apparatus. In addition, the image decoding apparatus decodes the encoded residual blocks to restore the residual blocks. In addition, the image decoding apparatus may generate the restored blocks by adding the restored residual blocks and the decoding target blocks to each other.

As another example, the image decoding apparatus adds the offset to the optimal prediction block and adds the restored residual blocks to the optimal prediction block added with the offset to generate the restored blocks.

As yet another example, the image decoding apparatus filters the optimal prediction block and adds the restored residual blocks to the filtered optimal prediction block to generate the restored blocks. In this case, the image decoding apparatus may filter the optimal prediction block by using the adaptive filter or the low pass filter. In addition, when the encoded filter coefficient is received from the image encoding apparatus, the image decoding apparatus decodes the encoded filter coefficient and may filter the optimal prediction block by using the decoded filter coefficient.

Figure 20:
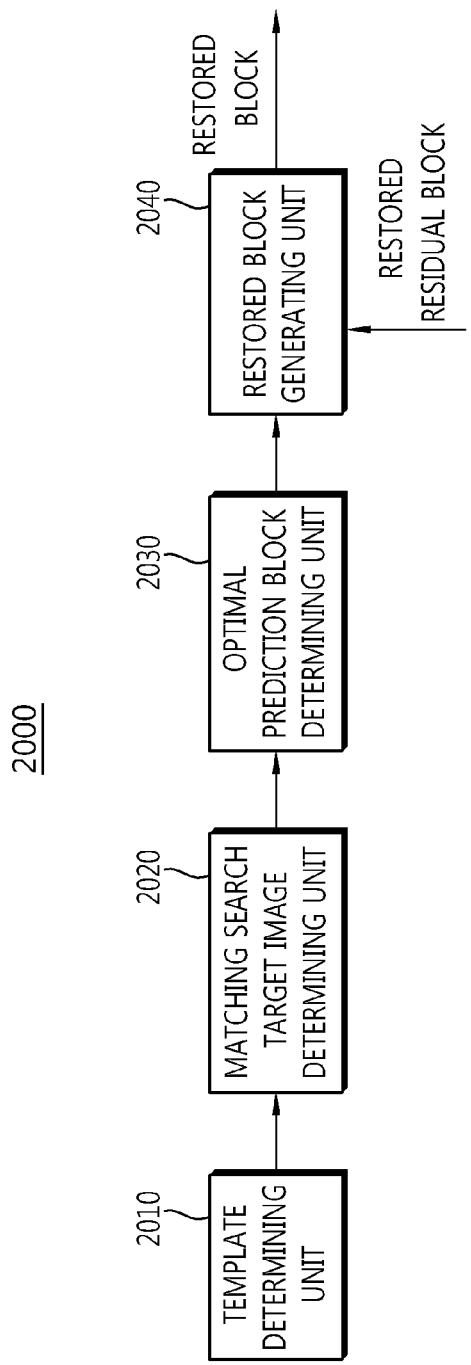
FIG. 20 is a block diagram showing a configuration of an image decoding apparatus according to an exemplary embodiment of the present invention.

FIG. 20 is a block diagram showing a configuration of an image decoding apparatus according to an exemplary embodiment of the present invention.

Referring to FIG. 20, the image decoding apparatus 2000 may include a template determining unit 2010, a matching search target image determining unit 2020, an optimal prediction block determining unit 2030, and a restored block generating unit 2040.

The template determining unit 2010 may determine the template by using at least one of the pixel set of the restored neighboring block and the prediction pixel set for the decoding target block.

The matching search target image determining unit 2020 may determine the matching search target image for the template determined among the restored reference images.

In this case, the matching search target image determining unit 2020 may determine the matching search target image which performs matching search with the determined template by using at least one of the decoding information of the image to which the decoding target block belongs, the decoding information of the neighboring block, and the matching search target image information defined in the SPS and the PPS. In this case, the matching search target image information may be defined in the SPS and the PPS by a user.

The optimal prediction block determining unit 2030 may determine the optimal prediction block by performing matching search of the template of the decoding target block targeting the determined matching search target image.

In this case, the optimal prediction block determining unit 2030 may determine the optimal prediction block by using at least one of the distortion between the template of the decoding target block and the matching target region and the similarity between the template of the decoding target block and the prediction block.

The restored block generating unit 2040 may generate the restored block based on the optimal prediction block and the restored residual blocks.

In this case, the restored block generating unit 2040 may generate the restored block by adding the optimal prediction block and the restored residual blocks to each other.

Further, the restored block generating unit 2040 adds the offset to the optimal prediction block and adds the optimal prediction block added with the offset and the restored residual block to generate the restored blocks. Herein, since the offset may be calculated by using the same method as the image encoding apparatus, a detailed description thereof will be omitted.

Further, the restored block generating unit 2040 filters the optimal prediction block and adds the filtered optimal prediction block and the restored residual block to generate the restored blocks.

The described blocks mean units of the image encoding and decoding. In this case, the encoding or decoding unit in the image encoding and decoding means a division unit at the time of dividing one image into subdivided blocks and encoding or decoding the blocks. As a result, the encoding or decoding unit may include blocks, macro blocks, encoding units, or prediction units. In this case, one block may be further divided into sub-blocks having the smaller size.

In addition, terms described below as terms used to appropriately express exemplary embodiments of the present invention may be changed depending on a user or operator's intention or convention. Therefore, the definitions of the terms should be made on the basis of overall contents of the specification.

As described above, the exemplary embodiments have been described and illustrated in the drawings and the specification. Herein, specific terms have been used, but are just used for the purpose of describing the present invention and are not used for defining the meaning or limiting the scope of the present invention, which is disclosed in the appended claims. Therefore, it will be appreciated to those skilled in the art that various modifications are made and other equivalent embodiments are available.

Accordingly, the scope of the present invention should not be limited based on the described embodiments and should be determined in light of the appended claims to be described below and equivalents thereto.

The invention claimed is:

1. An image encoding method, comprising:
    determining a template of an encoding target block;
    determining a matching search target image which performs matching search with the template by using at least one of encoding information of an image to which the encoding target block belongs, encoding information of a neighboring block, and user definition information;
    determining an optimal prediction block by using the matching search target image and the template; and
    generating a residual block by using the optimal prediction block and the encoding target block,
    wherein in the determining of the optimal prediction block, the optimal prediction block is determined by using similarity between the template and a prediction block,
    the prediction block has the same geometrical shape as the encoding target block within the matching search target image, and
    the similarity is determined by using at least one of distortion between pixels positioned at the template and the prediction block border, difference values between pixels positioned at the template and the prediction block border, variance of difference values between pixels positioned at the template and the prediction block border and correlation values between pixels positioned at the template and the prediction block border.

2. The image encoding method of claim 1, wherein in the determining of the matching search target image, one or more reference images corresponding to an image type of the image to which the encoding target block belongs among restored reference images are determined as the matching search target image.

3. The image encoding method of claim 1, wherein in the determining of the matching search target image, one or more reference images corresponding to a reference type of the neighboring block among the restored reference images are determined as the matching search target image.

4. The image encoding method of claim 1, wherein in the determining of the optimal prediction block,
    the optimal prediction block is determined by using distortion between the template and a matching target region and the similarity between the template and the prediction block,
    the matching target region has the same geometrical shape as the template within the matching search target image.

5. The image encoding method of claim 4, wherein the determining of the optimal prediction block includes:
    calculating the respective distortions between the template and matching target regions included in a plurality of matching search target images;
    selecting a plurality of prediction blocks in the order in which the distortion is smaller;
    judging the respective similarities between the selected plurality of prediction blocks and the template; and
    determining as the optimal prediction block a prediction block having the highest similarity from the selected plurality of prediction blocks.

6. The image encoding method of claim 4, wherein the determining of the optimal prediction block includes:
    calculating the respective similarities between the template and prediction blocks included in a plurality of matching search target images;
    selecting a plurality of prediction blocks in the order in which the similarity is higher;
    calculating the respective distortions between matching target regions corresponding to the selected plurality of prediction blocks and the template; and
    determining a prediction block in which the distortion is the minimum as the optimal prediction block.

7. The image encoding method of claim 1, wherein in the determining of the template,
    the template is determined by using at least one of a pixel set constituting a restored neighboring block and a prediction pixel set for the encoding target block, and
    the restored neighboring block is an already restored block among blocks adjacent to the encoding target block.

8. The image encoding method of claim 1, wherein in the generating of the residual block, the residual block is generated based on the optimal prediction block, offset, and the encoding target block.

9. The image encoding method of claim 1, wherein the generating of the residual block includes:
    filtering the optimal prediction block; and
    generating the residual block by using the filtered optimal prediction block and the encoding target block.

10. The image encoding method of claim 1, wherein in the determining of the optimal prediction block, the optimal prediction block is determined by using average values of the distortions between the template and the matching target regions and the similarities between the template and the prediction blocks.

11. An image encoding apparatus, comprising:
    a matching search target image determining unit determining a matching search target image by using at least one of encoding information of an image to which an encoding target block belongs, encoding information of a neighboring block, and user definition information among restored reference images;
    an optimal prediction block determining unit determining an optimal prediction block by using the matching search target image and a template of the encoding target block; and
    a residual block generating unit generating a residual block by using the optimal prediction block and the encoding target block,
    wherein the optimal prediction block determining unit determines the optimal prediction block by using similarity between the template and a prediction block,
    the prediction block has the same geometrical shape as the encoding target block within the matching search target image, and the similarity is determined by using at least one of distortion between pixels positioned at the template and the prediction block border, difference values between pixels positioned at the template and the prediction block border, variance of difference values between pixels positioned at the template and the prediction block border and correlation values between pixels positioned at the template and the prediction block border.

12. The image encoding apparatus of claim 11, wherein the matching search target image determining unit determines as the matching search target image one or more reference images among the restored reference images based on at least one of an image type of an image to which the encoding target block belongs, a reference type of the neighboring block, and user definition information.

13. The image encoding apparatus of claim 11, wherein the optimal prediction block determining unit determines the optimal prediction block by using distortion between the template and a matching target region and the similarity between the template and the prediction block.

14. An image decoding method, comprising:
determining a template of a decoding target block;
determining a matching search target image which performs matching search with the template by using at least one of decoding information of an image to which the decoding target block belongs, decoding information of a neighboring block, and matching search target image information;
determining an optimal prediction block by using the matching search target image and the template; and
generating restored blocks based on the optimal prediction block and restored residual blocks,
wherein in the determining of the optimal prediction block,
the optimal prediction block is determined by using similarity between the template and a prediction block,
the prediction block has the same geometrical shape as the decoding target block within the matching search target image, and
the similarity is determined by using at least one of distortion between pixels positioned at the template and the prediction block border, difference values between pixels positioned at the template and the prediction block border, variance of difference values between pixels positioned at the template and the prediction block border and correlation values between pixels positioned at the template and the prediction block border.

15. The image decoding method of claim 14, wherein in the determining of the matching search target image,
one or more reference images are determined as the matching search target image based on at least one of an image type of the image to which the encoding target block belongs among restored reference images, a reference type of the neighboring block, and the matching search target image information, and
the matching search target image information is received by using a sequence parameter set (SPS) or a picture parameter set (PPS).

16. The image decoding method of claim 14, wherein in the determining of the optimal prediction block,
the optimal prediction block is determined by using distortion between the template and a matching target region and the similarity between the template and the prediction block,
the matching target region has the same geometrical shape as the template within the matching search target image.

17. The image decoding method of claim 14, wherein in the determining of the template,
the template is determined by using at least one of a pixel set constituting a restored neighboring block and a prediction pixel set for the decoding target block, and
the restored neighboring block is an already restored block among blocks adjacent to the decoding target block.

18. The image decoding method of claim 14, wherein in the generating of the restored blocks, the restored blocks are generated based on the optimal prediction block, offset, and the restored residual blocks.

19. The image decoding method of claim 14, wherein the generating of the restored blocks includes:
filtering the optimal prediction block; and
generating the restored blocks by using the filtered optimal prediction block and the restored residual blocks.

20. An image decoding apparatus, comprising:
a matching search target image determining unit determining a matching search target image which performs matching search with the template of the decoding target block by using at least one of decoding information of an image to which a decoding target block belongs, decoding information of a neighboring block, and matching search target image information;
an optimal prediction block determining unit determining an optimal prediction block by using the matching search target image and the template; and
a restored block generating unit generating restored blocks based on the optimal prediction block and restored residual blocks,
wherein the optimal prediction block determining unit determines the optimal prediction block by using similarity between the template and a prediction block,
the prediction block has the same geometrical shape as the decoding target block within the matching search target image, and
the similarity is determined by using at least one of distortion between pixels positioned at the template and the prediction block border, difference values between pixels positioned at the template and the prediction block border, variance of difference values between pixels positioned at the template and the prediction block border and correlation values between pixels positioned at the template and the prediction block border.

* * * * *